United States Patent [19]

Karol et al.

[11] Patent Number: 5,034,366

[45] Date of Patent: Jul. 23, 1991

[54] HIGH ACTIVITY VANADIUM-BASED CATALYST

[75] Inventors: Frederick J. Karol, Belle Mead; Sun-Chueh Kao, Piscataway, both of N.J.

[73] Assignee: Union Carbide Chemicals And Plastics Technology Corporation, Danbury, Conn.

[21] Appl. No.: 459,383

[22] Filed: Dec. 29, 1989

[51] Int. Cl.$^5$ .............................................. C08F 4/68
[52] U.S. Cl. .................................... 502/119; 502/112; 502/123; 502/124; 502/125; 502/126; 502/127; 502/128; 526/128
[58] Field of Search ............... 502/112, 119, 123, 124, 502/125, 126, 127, 128

[56] References Cited

U.S. PATENT DOCUMENTS

| | | | |
|---|---|---|---|
| 4,403,081 | 9/1983 | Harada et al. | 502/125 X |
| 4,508,842 | 4/1985 | Beran et al. | 502/112 |
| 4,550,094 | 10/1985 | Hanji et al. | 502/125 X |
| 4,945,142 | 7/1990 | Gessell et al. | 502/128 |

FOREIGN PATENT DOCUMENTS 56-22308 3/1981 Japan .
62-25112 2/1987 Japan .

*Primary Examiner*—Patrick P. Garvin
*Attorney, Agent, or Firm*—John S. Piscitello

[57] ABSTRACT

A vanadium-based catalyst is treated with a polysiloxane oil as a means of enhancing catalyst activity and polymer productivity.

33 Claims, No Drawings

HIGH ACTIVITY VANADIUM-BASED CATALYST

FIELD OF THE INVENTION

This invention relates to a vanadium-based catalyst suitable for producing ethylene polymers having a broad molecular weight distribution at enhanced levels of catalyst activity and polymer productivity.

BACKGROUND OF THE INVENTION

U.S. Pat. No. 4,508,842 discloses a highly active vanadium-containing catalyst capable of producing ethylene polymers having a broad molecular weight distribution. Said catalyst comprises:
(A) a solid catalyst component
consisting essentially of
(1) an inorganic carrier, as support for
(2) the reaction product of (a) a vanadium trihalide and (b) an electron donor, and
(3) a boron halide or alkyl-aluminum modifier,
(B) an alkylaluminum cocatalyst, and
(C) a halohydrocarbon polymerization promoter.

The polymers produced in accordance with U.S. Pat. No. 4,508,842 have a relatively broad molecular weight distribution, and excellent extrudability. These properties render them extremely useful in a wide variety of applications, such as wire and cable insulation, blow molding, film, and pipe fabrication.

Copending application Ser. No. 292,268 (now U.S. Pat. No. 4,000,327) of Sun-Chueh Kao et al. discloses that the activity of the catalyst disclosed in U.S. Pat. No. 4,508,842, supra, can be enhanced by treating the solid component thereof with an alkoxysilicon compound. However, such treatment also causes a narrowing of the molecular weight distribution of the polymers produced with such catalyst.

Japanese Public Disclosure No. 62-25112 (Application Ser. No. 60-163525) likewise discloses vanadium-containing catalyst compositions useful in the preparation of ethylene polymers having a narrow molecular weight distribution. Such compositions consist of:
(1) a solid catalyst component obtained by precipitating vanadium trihalide from an ether solution onto a silica and/or alumina carrier and then treating the product with an alkylaluminum,
(2) an alkylaluminum,
(3) an alkyl halide, and
(4) an alkoxy compound of silicon.

Japanese Public Disclosure No. 56-22308 (Application Ser. No. 54-981281) is yet another reference which discloses vanadium-containing catalyst compositions useful in the preparation of ethylene copolymers having a narrow molecular weight distribution. The catalyst compositions of this reference are prepared by combining an organoaluminum compound and a solvent-soluble vanadium compound in the presence of olefin monomer and then adding polysiloxane to the mixture.

SUMMARY OF THE INVENTION

In accordance with the present invention, it has now been discovered that ethylene polymers having a broad molecular weight distribution can be produced at enhanced levels of catalyst activity and polymer productivity employing a vanadium-based catalyst system comprising:
(A) a solid catalyst component consisting essentially of
(1) a solid, particulate, porous inorganic carrier, as support for
(2) the reaction product of (a) a vanadium trihalide and (b) an electron donor, and
(3) a boron halide or alkylaluminum modifier,
(B) an alkylaluminum cocatalyst, and
(C) a halohydrocarbon polymerization promoter,
wherein catalyst component (A) has been treated with a polysiloxane oil activity regulator having the formula:

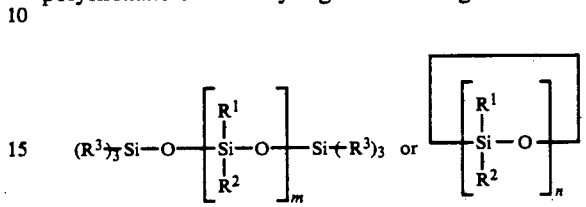

wherein:
m is a number having a value of from 0 to 100,
n is a number having a value of from 2 to 100,
$R^1$ is hydrogen or a monovalent hydrocarbon radical free of aliphatic unsaturation containing from 1 to 20 carbon atoms,
$R^2$ is a monovalent hydrocarbon radical free of aliphatic unsaturation containing from 1 to 20 carbon atoms, and
$R^3$ is selected from the group consisting of: —X, —$R^1$, —$OR^1$, —$COOR^1$, and —$NR^1R^2$
wherein:
X is halogen and $R^1$ and $R^2$ are as defined above.

Thus, the catalyst system of the present invention comprises:
(A) a solid catalyst component consisting essentially of
(1) a solid, particulate, porous inorganic carrier, as support for
(2) the reaction product of (a) a vanadium trihalide and (b) an electron donor,
(3) a boron halide or alkyl-aluminum modifier, and
(4) a polysiloxane oil activity regulator having the formula:

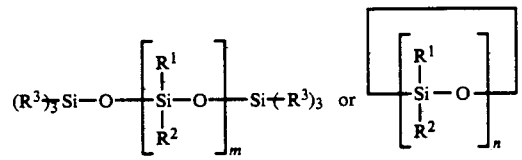

wherein:
$R^1$, $R^2$, $R^3$, m and n are as defined above,
(b) an alkylaluminum cocatalyst, and
(C) a halohydrocarbon polymerization promoter.

DETAILED DESCRIPTION OF THE INVENTION

The vanadium-containing catalyst systems treated with a polysiloxane oil activity regulator in accordance with the present invention have been found to be significantly more active than like untreated catalyst systems at usual polymerization temperatures. As a result, it is possible to produce ethylene polymers at enhanced levels of catalyst activity and polymer productivity by employing these catalyst systems at such temperatures. However, the polymerization activity of these catalyst system has been found to diminish as the temperature increases. Eventually, at elevated temperatures the polymerization rate slows to a rate below that of like untreated catalyst systems. This decrease in catalyst activity is particularly important in gas phase polymerizations as it helps prevent the possibility of catalyst fusing, hot-spotting and a runaway reaction should the reaction temperature rise excessively due to polymerization exotherm.

When polymerization is effected in gas phase or in a slurry, the temperature employed can vary from about 10° C. to about 115° C., preferably from about 80° C. to about 90° C. When polymerization is effected in solution, the temperature can vary from about 150° C. to about 250° C. At the temperature required for solution polymerization, the catalyst systems of the present invention do not display enhanced activity and are ineffective as polymerization promoters. However, at temperatures up to about 90° C., ordinarily employed in gas phase and slurry polymerizations, these catalyst systems display enhanced activity of up to about 100 percent. Beyond 90° C., activity enhancement begins to diminish, and finally at temperatures in excess of 100° C., activity decreases to a level below that of like untreated catalyst systems.

The reduced activity demonstrated by the catalyst systems of the present invention at temperatures in excess of 100° C. is particularly important in gas phase polymerizations where care must be exercised to maintain the temperature below the sintering temperature of the polymers produced in order to prevent polymer agglomeration. As explained above, decreased catalyst activity helps prevent the possibility of catalyst fusing, hot-spotting and a runaway reaction should the reaction temperature rise excessively due to polymerization exotherm.

Catalyst component (A) consists essentially of:
(1) a solid, particulate, porous inorganic carrier, as support for
(2) the reaction product of (a) a vanadium trihalide and (b) an electron donor,
(3) a boron halide or alkylaluminum modifier, and
(4) a polysiloxane oil activity regulator having the formula:

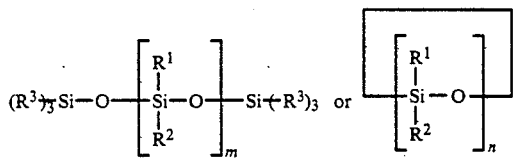

wherein:
$R^1$, $R^2$, $R^3$, m and n are as defined above.

The vanadium trihalide which is reacted with the electron donor in the preparation of catalyst component (A) is preferable vanadium trichloride, although the halogen present in said vanadium trihalide may be chlorine, bromine or iodine, or any mixture thereof.

The electron donor employed is a liquid, organic Lewis base in which the vanadium trihalide is soluble.

Suitable electron donors include alkyl esters of aliphatic and aromatic carboxylic acids, aliphatic ketones, aliphatic amines, aliphatic alcohols, aliphatic ethers and cycloaliphatic ethers. Particularly useful are alkyl esters of saturated aliphatic carboxylic acids containing from 1 to 4 carbon atoms; alkyl esters of aromatic carboxylic acids containing from 7 to 8 carbon atoms; aliphatic ketones containing from 3 to 6 carbon atoms, preferably from 3 to 4 carbon atoms; aliphatic amines containing from 1 to 14 carbon atoms, preferably from 2 to 8 carbon atoms; aliphatic alcohols containing from 1 to 8 carbon atoms, preferably from 2 to 8 carbon atoms; aliphatic ethers containing from 2 to 8 carbon atoms, preferably from 4 to 5 carbon atoms; and cycloaliphatic ethers containing from 4 to 5 carbon atoms, preferably mono- or di- ethers containing 4 carbon atoms. The aliphatic and cycloaliphatic ethers are most preferred, particularly tetrahydrofuran. If desired, these electron donors may be substituted with one or more substituents which are inert under the reaction conditions employed during reaction with the vanadium trihalide, as well as during preparation of and polymerization with catalyst component (A).

The modifier employed in the preparation of catalyst component (A) is a boron halide or alkylaluminum compound having the formula:

$$MX_a$$

wherein:
M is boron or $AlR^4{}_{(3-a)}$ wherein each $R^4$ is an alkyl radical containing from 1 to 14 carbon atoms, which radicals may be the same or different,
X is selected from the group consisting of fluorine, chlorine, bromine and iodine, and mixtures thereof, and
a is an integer having a value of 0, 1 or 2, provided that a is 3 when M is boron.

Preferably any halide present in the modifier is chlorine, and any alkyl radicals present contain from 1 to 6 carbon atoms. Such alkyl radicals may be cyclic, branched or straight chain, and may be substituted with one or more substituents which are inert under the reaction conditions employed during preparation of and polymerization with catalyst component (A). Diethylaluminum chloride is preferred.

The polysiloxane oil employed to treat catalyst component (A) has the formula:

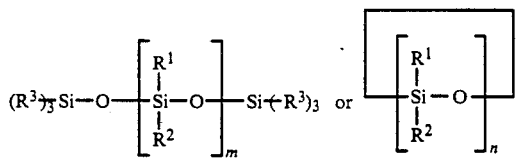

wherein:
m is a number having a value of from 0 to 100, preferably from 2 to 50,
n is a number having a value of from 2 to 100, preferably from 3 to 10,
$R^1$ is hydrogen or a monovalent hydrocarbon radical free of aliphatic unsaturation containing from 1 to 20 carbon atoms,
$R^2$ is a monovalent hydrocarbon radical free of aliphatic unsaturation containing from 1 to 20 carbon atoms, and
$R^3$ is selected from the group consisting of: —X, —$R^1$, —$OR^1$, —$COOR^1$, and —$NR^1R^2$
wherein:
X is halogen and $R^1$ and $R^2$ are as defined above.
$R^2$, is usually an alkyl radical containing from 1 to 20 carbon atoms, preferably from to 1 to 6 carbon atoms, or an aryl radical containing from 6 to 20 carbon atoms, preferably 6 carbon atoms. $R^1$ is usually hydrogen or a like alkyl or aryl radical, and $R^3$ is usually halogen or a like alkyl or aryl radical. Such radicals may be substituted with one or more substituents which are inert under the reaction conditions employed during treatment of and polymerization with catalyst component (A). Typical substituents include chlorine and fluorine.

The polysiloxane oils which can be employed to treat catalyst component (A) include linear polysiloxanes such as polymethylhydrosiloxanes and polydimethylsiloxanes, as well as cyclic polysiloxanes such as 1,3,5,7-tetramethylcyclotetrasiloxane. The linear polysiloxanes can be terminated with groups such as alkyl, chlorine, hydrogen and hydroxyl.

A solid, particulate, porous inorganic material is employed as carrier in the preparation of catalyst component (A). The carrier serves as support for the vanadium trihalide/electron donor reaction product, the boron halide or alkylaluminum modifier, and the polysiloxane oil. Suitable carriers include such materials as oxides of silicon, aluminum and zirconium, as well as phosphates of aluminum. Usually these materials have an average particle size of from about 10 microns to about 250 microns, preferably from about 20 microns to about 150 microns, and a surface area of at least 3 square meters per gram, preferably at least 50 square meters per gram. Polymerization activity of the catalyst can be improved by employing a silica support having an average pore size of at least 80 Angstrom units, preferably at least 100 Angstrom units. The carrier material should be dry, that is, free of absorbed water. Drying of the carrier material can be effected by heating, e.g., at a temperature of at least 600° C. when silica is employed as the support.

Catalyst component (A) is prepared by treating a solid, particulate, porous inorganic carrier with:
(1) the reaction product of (a) a vanadium trihalide and (b) an electron donor,
(2) a boron halide or alkylaluminum modifier, and
(3) a polysiloxane oil having the formula:

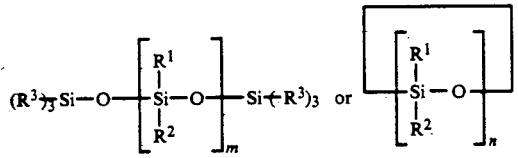

wherein:
$R^1$, $R^2$, $R^3$, m and n are as defined above.

The vanadium trihalide/electron donor reaction product is prepared by dissolving at least one vanadium trihalide in at least one electron donor at a temperature of from about 20° C. up to the boiling point of the electron donor. Dissolution of the vanadium trihalide in the electron donor can be facilitated by stirring, and in some instances by refluxing, the vanadium trihalide in the electron donor. Up to several hours of heating may be required to complete dissolution.

After the vanadium trihalide has been dissolved in the electron donor, the reaction product is impregnated into the carrier. Impregnation may be effected by adding the carrier to the solution of the vanadium trihalide in the electron donor, and then drying the mixture to remove excess electron donor. The carrier may be added alone as a dry powder or, if desired, as a slurry in additional electron donor. Alternatively, the solution of the vanadium trihalide in the electron donor may be added to the carrier. Ordinarily the carrier and the solution of the vanadium trihalide in the electron donor are mixed together in such amounts that, after drying, the impregnated carrier contains from about 0.05 mmoles to about 0.6 mmoles of vanadium per gram, preferably from about 0.3 mmoles to about 0.6 mmoles of vanadium per gram, and most preferably from about 0.3 mmoles to about 0.5 mmoles of vanadium per gram. The impregnated vanadium trihalide/electron donor reaction product prepared in this manner contains from about 1 mole to about 5 moles, preferably from about 2 moles to about 4 moles, and most preferably about 3 moles of electron donor per mole of vanadium trihalide. Excess electron donor not actually complexed with the vanadium trihalide may remain adsorbed on the carrier without ill effects.

The boron halide or alkylaluminum modifier is usually added to the carrier after it has been impregnated with the vanadium trihalide/electron donor reaction product. However, if desired, the boron halide or alkylaluminum modifier may be added to the carrier before it is impregnated with the vanadium trihalide/electron donor reaction product. Addition of the modifier to the carrier may be effected by dissolving one or more modifiers in one or more inert liquid solvents capable of dissolving the modifier, immersing the carrier in the solution, and then drying the mixture to remove the solvent. If the modifier is applied subsequent to the vanadium trihalide/electron donor reaction product, the solvent must be one which does not dissolve the vanadium trihalide/electron donor reaction product. The carrier may be added to the solution of the modifier alone as a dry powder or, if desired, as a slurry in additional inert liquid solvent. Alternatively, the solution of the modifier may be added to the carrier. Ordinarily the carrier and the solution of the modifier in the inert liquid solvent are mixed together in such amounts that, after drying, the carrier contains from about 0.1 mole to about 10 moles, preferably from about 1 mole to about 5 moles, of modifier per mole of vanadium trihalide/electron donor reaction product present in the carrier (or to be added to the carrier if it is applied subsequent to the modifier).

Among the solvents which can be employed to dissolve the boron halide or alkylaluminum modifier are hydrocarbon solvents such as isopentane, hexane, heptane, toluene, xylene and naphtha.

Addition of the polysiloxane oil to the carrier may be effected in the same manner as addition of the modifier, i.e., by dissolving the polysiloxane oil in one or more inert liquid solvents capable of dissolving the polysiloxane oil, immersing the carrier in the solution, and drying the mixture to remove the solvent. If the polysiloxane oil is applied subsequent to the vanadium trihalide/electron donor reaction product, the solvent must be one which does not dissolve the vanadium trihalide/electron donor reaction product. While the polysiloxane oil is usually applied separately, for convenience it may be applied together with the modifier in a single solution, provided that the modifier and polysiloxane oil employed are not reactive with each other. In any case, the carrier may be added to the solution of the polysiloxane oil alone as a dry powder or, if desired, as a slurry in additional inert liquid solvent. Alternatively, the solution of the polysiloxane oil may be added to the carrier.

The amount of polysiloxane oil employed in the preparation of catalyst component (A) depends upon the particular polysiloxane oil employed and the degree of catalyst activity enhancement desired. Generally, at constant temperature, catalyst activity increases as the molar ratio of polysiloxane oil to vanadium trihalide/electron donor reaction product increases up to a value of about 6:1 (based on the average molecular weight of the polysiloxane oil). Beyond a ratio of about 6:1, however, enhancement of catalyst activity begins to diminish, and finally at a ratio in excess of about 10:1, activity decreases to a level below that of like untreated catalyst systems. For this reason, the polysiloxane oil is generally employed in amounts such as to provide a molar ratio of the polysiloxane oil to vanadium trihalide/electron donor reaction product of from about 0.1:1 to about 10:1, preferably from about 0.2:1 to about 6:1.

Component (B) of the catalyst system of the present invention is an alkylaluminum cocatalyst having the formula $$Al(R^5)_3$$

wherein each $R^5$ is a saturated hydrocarbon radical containing from 1 to 14 carbon atoms, which radicals may be the same or different. Such radicals may be substituted with one or more substituents which are inert under the reaction conditions employed during polymerization. Preferably $R^5$ is an alkyl radical containing from 2 to 8 carbon atoms.

Component (C) of the catalyst system of the present invention is a halohydrocarbon polymerization promoter having the formula $$R^6{}_bCX'_{(4-b)}$$

wherein:
$R^6$ is hydrogen or an unsubstituted or halosubstituted alkyl radical containing from 1 to 6 carbon atoms, which radicals may be the same or different,
X' is halogen, and
b is 0, 1 or 2.

Preferred promoters include flouro-, chloro- or bromo- substituted ethane or methane such as $CCl_4$, $CHCl_3$, $CH_2Cl_2$, $CBr_4$, $CFCl_3$, $CH_3CCl_3$, and $CF_2ClCCl_3$. Particularly preferred promoters are $CH_3CCl_3$, $CFCl_3$, and $CHCl_3$.

Polymerization is effected, with the catalyst system of the present invention by contacting ethylene, or a mixture of ethylene and at least one alpha-olefin having 3 to 8 carbon atoms, with the three components of the catalyst system, i.e., the solid catalyst component (treated with the polysiloxane oil), the alkylaluminum cocatalyst, and the halohydrocarbon polymerization promoter. While polymerization can be effected employing either slurry or gas phase techniques, it is preferably effected in a fluid bed reaction system. Suitable fluid bed reaction systems are described, e.g., in U.S. Pat. No. 4,302,565, 4,302,566 and 4,303,771, the disclosures of which are incorporated herein by reference.

The solid catalyst component, cocatalyst and polymerization promoter can be introduced into the polymerization reactor through separate feed lines or, if desired, two or all of the components may be partially or completely mixed with each other before they are introduced into the reactor. In any event, the cocatalyst and polymerization promoter are employed in such amounts as to provide a molar ratio of the promoter to the alkylaluminum cocatalyst of from about 0.1:1 to about 10:1, preferably from about 0.2:1 to about 2:1, and the cocatalyst and the solid catalyst component are employed in such amounts as to provide an atomic ratio of aluminum in the cocatalyst to vanadium in the solid catalyst component of from about 10:1 to about 400:1, preferably from about 15:1 to about 60:1.

Both the cocatalyst and the polymerization promoter may be introduced into the reactor dissolved in an inert liquid solvent, i.e., a solvent which is nonreactive with all the components of the catalyst system as well as all the components of the reaction system. Hydrocarbons such as isopentane, hexane, heptane, toluene, xylene, naphtha and mineral oil are preferred for this purpose. Generally, such solutions contain from 1 weight percent to 75 weight percent of the cocatalyst and/or the polymerization promoter. If desired, less concentrated or more concentrated solutions can be employed, or, alternatively, the cocatalyst and polymerization promoter can be added in the absence of solvent, or, if desired, suspended in a stream of liquified monomer. When a solvent is employed and polymerization is conducted in gas phase, the amount of solvent introduced into the reactor should be carefully controlled so as to avoid the use of excessive quantities of liquid which would interfere with such polymerization.

The solvents employed to dissolve the cocatalyst and the polymerization promoter may also be employed to introduce the solid catalyst component into the reactor. Higher boiling solvents, such as mineral oil, are preferred for this purpose. While the solid catalyst component may also be introduced into the reactor in the absence of solvent or suspended in liquified monomer, such solvents may be employed to disperse the solid catalyst component and facilitate its flow into the reactor. Such dispersions generally contain from 1 weight percent to 75 weight percent of the solid catalyst component.

The alpha-olefins which may be polymerized with ethylene contain from 3 to 8 carbon atoms per molecule. These alpha-olefins should not contain any branching or any of their atoms closer than two carbon atoms removed from the double bond. Suitable alpha-olefins include propylene, butene-1, pentene-1, hexene-1, 4-methyl-pentene-1, heptene-1 and octene-1. The preferred alpha-olefins are propylene, butene-1, hexene-1, 4-methylpentene and octene-1.

As previously noted, the temperature employed during polymerization can vary from about 10° C. to about 115° C., preferably from about 80° C. to about 90° C., whether polymerization is effected in gas phase or in a slurry. As also noted, when polymerization is conducted in gas phase, the temperature must be maintained below the sintering temperature of the polymers produced in order to prevent polymer agglomeration. On the other hand, the temperature employed must also be sufficiently elevated to prevent substantial condensation of the reaction mixture to the liquid state, as such condensation will cause the polymer particles being produced to cohere to each other and likewise aggravate the polymer agglomeration problem. This difficulty is normally associated with the use of alpha-olefins having 5 or more carbon atoms which have relatively high dew points. While some minor condensation is tolerable, anything beyond this will cause reactor fouling.

The pressure employed can vary from subatmospheric to superatmospheric. Pressures of up to about 7000 kPa, preferably of from about 70 kPa to about 3500 kPa, are suitable for gas phase, slurry and solution polymerizations.

If desired, polymerization may be conducted in the presence of an inert gas, i.e., a gas which is nonreactive under the conditions employed during polymerization. The reactor should, however, be maintained substantially free of undesirable catalyst poisons, such as moisture, oxygen, carbon monoxide, carbon dioxide, acetylene, and the like.

When polymerization is conducted in a fluid bed, the superficial gas velocity of the gaseous reaction mixture through the bed must exceed the minimum flow required for fluidization in order to maintain a viable fluidized bed.

The polymers produced with the catalyst system of the present invention have a molecular weight distribution (MWD), defined as the ratio of weight average molecular weight to number average molecular weight ($M_w/M_n$), of greater than 10, usually from about 14 to about 22. Another means of indicating the molecular weight distribution of a polymer is by the melt flow ratio (MFR) of that polymer. By melt flow ratio is meant the flow index:melt index ratio of the polymer, wherein flow index and melt index are determined in accordance with ASTM D-1238, Conditions F and E, respectively. The polymers produced with the catalyst system of the present invention have a melt flow ratio of from about 45 to about 130. For these polymers, such MFR values correspond to the $M_w/M_n$ values set forth above.

The polymers produced with the catalyst system of the present invention have a melt index of from greater than 0 g/10 minutes to about 500 g/10 minutes, usually of from about 0.1 g/10 minutes to about 100 g/10 minutes. The melt index of a polymer varies inversely with its molecular weight and is a function of the hydrogen/monomer ratio employed in the reaction system, the polymerization temperature, and the density of the polymer. Thus, the melt index is raised by increasing the hydrogen/monomer ratio, the polymerization temperature, and/or the ratio of higher alpha olefin to ethylene employed in the reaction system.

The polymers produced with the catalyst system of the present invention are also characterized by a density of from about 0.86 g/cm$^3$ to about 0.96 g/cm$^3$. Such polymers generally contain at least 50 mol percent of polymerized ethylene and no more than 50 mol percent of polymerized alpha olefin containing from 3 to 8 carbon atoms and, optionally, polymerized diene. When polymerized diene is present, the polymer ordinarily contains from 0.01 mol percent to 10 mol percent of at least one such diene, from 6 mol percent to 55 mol percent of at least one polymerized alpha olefin containing from 3 to 8 carbon atoms, and from 35 mol percent to 94 mol percent of polymerized ethylene.

The polymers produced with the catalyst system of the present invention have an n-hexane extractable content of less than 3 weight percent. The n-hexane extractables content of such polymers is up to 60 percent less than that of polymers produced with like untreated catalysts.

The following Examples are designed to illustrate the process of the present invention and are not intended as a limitation upon the scope thereof.

The properties of the polymers produced in the Examples were determined by the following test methods:

Density

A plaque is made and conditioned for one hour at 120° C. to approach equilibrium crystallinity and is then quickly cooled to room temperature. Measurement for density is then made in a density gradient column, and density values are reported as grams/cm$^3$.

Melt Index (MI)

ASTM D-1238, Condition E. Measured at 190° C. and reported as grams per 10 minutes.

Flow Index (FI)

ASTM D-1238, Condition F. Measured at 10 times the weight used in the melt index text above.

Melt Flow Ratio (MFR)

Ratio of Flow Index : Melt Index.

n-Hexane Extractables

A 200 square inch sample of 1.5 mil gauge film is cut into strips measuring 1"×6" and weighed to the nearest 0.1 mg. The strips are placed in a vessel and extracted with 300 ml. of n-hexane at 50±1° C. for 2 hours. The extract is then decanted into tared culture dishes previously weighed to the nearest 0.1 mg. After drying the extract in a vacuum desiccator the culture dishes are weighed to the nearest 0.1 mg. The extractables, normalized with respect to the original sample weight, is then reported as the weight percent of n-hexane extractables.

Productivity

A sample of the resin product is ashed, and the weight percent of ash is determined. The amount of V and halide in the ash is determined by elemental analysis. Productivity is expressed in terms of parts per million of V in the polymer.

Activity

Activity values are normalized values based upon grams of polymer produced per mmol of vanadium in the catalyst per hour per 100 psi of ethylene polymerization pressure.

EXAMPLE 1

Impregnation of Carrier with VCl$_3$/THF Reaction Product

To a flask equipped with a mechanical stirrer were added 4 liters of anhydrous tetrahydrofuran (THF), followed by 50 grams (0.318 mole) of solid VCl$_3$. The mixture was heated under nitrogen at a temperature of 65° C. for 5 hours with continuous stirring in order to completely dissolve the VCl$_3$.

Eight hundred grams (800 g) of silica gel were dehydrated by heating under nitrogen at a temperature of 600° C. for 20 hours. The dehydrated gel was added to the solution prepared as above, and the mixture was refluxed for one hour under nitrogen. At the end of this time, the mixture was heated at a temperature of 55° C. for about 6 hours under a purge of dry nitrogen to produce a dry, free-flowing powder containing about 8 weight percent THF.

EXAMPLE 2

Treatment of Carrier with Diethylaluminum Chloride

Five hundred grams (500 g) of the silica carrier impregnated with VCl₃/THF reaction product in accordance with Example 1 were slurried in 4 liters of anhydrous hexane. The slurry was continuously stirred while a 10 weight percent solution of diethylaluminum chloride in anhydrous hexane was added over a period of 30 minutes. The impregnated carrier and the diethylaluminum chloride solution were employed in amounts that provided a desired atomic ratio of aluminum to vanadium. After addition of the diethylaluminum chloride solution was complete, the mixture was heated at a temperature of 45° C. for about 6 hours under a purge of dry nitrogen to produce a dry, free-flowing powder.

EXAMPLE 3

Treatment of Carrier with Polysiloxane Oil

Five grams (5.0 g) of the silica carrier treated with diethylaluminum chloride in accordance with Example 2 were slurried in 30 ml of anhydrous hexane. The slurry was continuously stirred while a one molar solution of a polysiloxane oil (based on the average molecular weight of the polysiloxane oil) in anhydrous hexane was added over a period of 5 minutes. After addition of the solution was complete, the mixture was stirred for an additional 30-60 minutes. At the end of this time, the mixture was heated at a temperature of 50° C. either under vacuum or under a purge of dry nitrogen to remove the hexane diluent and produce a free-flowing powder.

The procedure was repeated a number of times with various polysiloxane oils.

Table I below sets forth the particular polysiloxane oil activity regulator employed in each of these experiments, as well as the molar ratio of such activity regulator to vanadium present in the treated carrier.

TABLE I

| Example 3 | Polysiloxane Oil Activity Regulator | Mol Ratio of Activity Regulator to Vanadium In Treated Carrier |
|---|---|---|
| (a) | Polymethylhydrosiloxane (1) (Methyl terminated) (Mol. Wt. = 360-420) | 3.0 |
| (b) | Polymethylhydrosiloxane (1) (Methyl terminated) (Mol. Wt. = 360-420) | 4.5 |
| (c) | Polymethylhydrosiloxane (1) (Methyl terminated) (Mol. Wt. = 360-420) | 5.5 |
| (d) | Polymethylhydrosiloxane (1) (Methyl terminated) (Mol. Wt. = 360-420) | 6.0 |
| (e) | Polymethylhydrosiloxane (1) (Methyl terminated) (Mol. Wt. = 360-420) | 7.0 |
| (f) | Polymethylhydrosiloxane (1) (Methyl terminated) (Mol. Wt. = 360-420) | 7.5 |
| (g) | Polymethylhydrosiloxane (2) (Methyl terminated) (Mol. Wt. = 2270) | 0.7 |
| (h) | Polydimethylsiloxane (Chlorine terminated) (Mol. Wt. = 425-600) | 5.0 |
| (i) | 1,3,5,7-Tetramethylcyclotetrasiloxane | 5.0 |

EXAMPLES 4-16

Copolymerization of Ethylene With Hexene-1

The solid catalyst components prepared as described in Example 3 were employed together with an alkylaluminum compound, as cocatalyst, and a halohydrocarbon compound, as polymerization promoter, to copolymerize ethylene and hexene-1 in a one-liter autoclave reactor.

In each polymerization, the three catalyst components were pre-mixed in a 6 ounce bottle containing 100 ml of hexane before being added to the reactor. Twenty milliliters (20.0 ml) of hexene-1 were added to the pre-mixed catalyst components before the resulting mixture was transferred to the reactor. Anhydrous conditions were maintained at all times.

The polymerization reactor was dried by heating at 96° C. under a stream of dry nitrogen for 40 minutes. After cooling the reactor to 50° C., 500 ml of hexane were added to the reactor, and the reactor contents were stirred under a gentle flow of nitrogen. The pre-mixed catalyst components were then transferred to the reactor under a stream of nitrogen and the reactor was sealed. The temperature of the reactor was gradually raised to 60° C. and the reactor was pressurized with hydrogen to a pressure of 10 kPa. The temperature was then raised to 75° C. and the reactor was pressurized to 1050 kPa with ethylene. Heating was continued until the desired polymerization temperature of 85° C. was attained. Polymerization was allowed to continue for 30 minutes, during which time ethylene was continually added to the reactor to maintain the pressure constant. At the end of 30 minutes, the reactor was vented and opened.

Table III below sets forth the details involving the composition of the catalysts employed in these polymerizations, as well as the reaction conditions employed during polymerization, the properties of the polymers produced, and the productivity of each catalyst system.

Shorthand designations employed in Table III are defined as follows:

TABLE II

| Designation | Definition |
|---|---|
| THF | Tetrahydrofuran |
| DEAC | Diethylaluminum chloride |
| TEAL | Triethylaluminum |
| TIBA | Triisobutylaluminum |
| TNHAL | Tri-n-hexylaluminum |
| PMHS | Polymethylhydrosiloxane |
| PDMS | Polydimethylsiloxane |
| TMCTS | 1,3,5,7-tetramethylcyclotetrasiloxane |

COMPARATIVE EXAMPLES A-F

For comparative purposes, ethylene was copolymerized with hexene-1 as in Examples 4-16 employing the solid catalyst components prepared in accordance with Example 2, i.e., the catalyst components employed had not been treated with polysiloxane oil activity regulator as in Example 3. The details of these polymerization are set forth in Table III below along with the details of Examples 4-16.

TABLE III

| EXAMPLE | Comp. Exp. A | 4 | 5 | 6 | 7 | 8 | Comp. Exp. B |
|---|---|---|---|---|---|---|---|
| Catalyst | | | | | | | |
| Carrier | $SiO_2$ | $SiO_2$ | $SiO_2$ | $SiO_2$ | $SiO_2$ | $SiO_2$ | $SiO_2$ |
| Precursor | $VCl_3$/THF | $VCl_3$/THF | $VCl_3$/THF | $VCl_3$/THF | $VCl_3$/THF | $VCl_3$/THF | $VCl_3$/THF |
| Modifier | DEAC | DEAC | DEAC | DEAC | DEAC | DEAC | DEAC |
| Modifier/V Ratio | 1.5 | 1.5 | 1.5 | 1.5 | 1.5 | 1.5 | 4.5 |
| Activity Regulator | — | PMHS (1) | PMHS (1) | PMHS (1) | PMHS (1) | PMHS (1) | — |
| Activity Regulator/V Ratio | — | 3.0 | 4.5 | 5.5 | 6.0 | 7.5 | — |
| Cocatalyst | TEAL | TEAL | TEAL | TEAL | TEAL | TEAL | TEAL |
| Al/V Ratio | 40 | 40 | 40 | 40 | 40 | 40 | 40 |
| Promoter | $CFCl_3$ | $CFCl_3$ | $CFCl_3$ | $CFCl_3$ | $CFCl_3$ | $CFCl_3$ | $CFCl_3$ |
| Promoter/Al Ratio | 1.0 | 1.0 | 1.0 | 1.0 | 1.0 | 1.0 | 1.0 |
| Reactions Conditions | | | | | | | |
| Temperature, °C. | 85 | 85 | 85 | 85 | 85 | 85 | 85 |
| Pressure, kPa | 1050 | 1050 | 1050 | 1050 | 1050 | 1050 | 1050 |
| Reaction time, minutes | 30 | 30 | 30 | 30 | 30 | 30 | 30 |
| Polymer Properties | | | | | | | |
| Density, g/cm³ | 0.944 | 0.946 | 0.944 | 0.948 | 0.947 | 0.946 | 0.944 |
| Melt Index, g/10 min. | 1.2 | 11 | 1.7 | 0.7 | 2.2 | 1.2 | 1.6 |
| Flow Index, g/10 min. | 73 | 594 | 114 | 46 | 123 | 84 | 98 |
| Melt Flow Ratio | 61 | 54 | 67 | 66 | 56 | 70 | 61 |
| Activity | | | | | | | |
| g polymer/mmol V-Hr-100 psi $C_2H_4$ | 1600 | 2197 | 2812 | 2973 | 2895 | 2335 | 2839 |
| Activity Increase vs. Control, % | — | 37 | 76 | 86 | 81 | 46 | — |

| EXAMPLE | 9 | Comp. Exp. C | 10 | 11 | 12 | 13 |
|---|---|---|---|---|---|---|
| Catalyst | | | | | | |
| Carrier | $SiO_2$ | $SiO_2$ | $SiO_2$ | $SiO_2$ | $SiO_2$ | |
| Precursor | $VCl_3$/THF | $VCl_3$/THF | $VCl_3$/THF | $VCl_3$/THF | $VCl_3$/THF | $VCl_3$/THF |
| Modifier | DEAC | DEAC | DEAC | DEAC | DEAC | DEAC |
| Modifier/V Ratio | 4.5 | 1.5 | 1.5 | 1.5 | 1.5 | 1.5 |
| Activity Regulator | PMHS (1) | — | PMHS (1) | PMHS (2) | PDMS | TMCTS |
| Activity Regulator/V Ratio | 4.5 | — | 5.5 | 0.7 | 5.0 | 5.0 |
| Cocatalyst | TEAL | TEAL | TEAL | TEAL | TEAL | TEAL |
| Al/V Ratio | 40 | 40 | 40 | 40 | 40 | 40 |
| Promoter | $CFCl_3$ | $CHCl_3$ | $CHCl_3$ | $CHCl_3$ | $CHCl_3$ | $CHCl_3$ |
| Promoter/Al Ratio | 1.0 | 1.0 | 1.0 | 1.0 | 1.0 | 1.0 |
| Reactions Conditions | | | | | | |
| Temperature, °C. | 85 | 85 | 85 | 85 | 85 | 85 |
| Pressure, kPa | 1050 | 1050 | 1050 | 1050 | 1050 | 1050 |
| Reaction time, minutes | 30 | 30 | 30 | 30 | 30 | 30 |
| Polymer Properties | | | | | | |
| Density, g/cm³ | 0.948 | 0.946 | 0.943 | 0.943 | 0.945 | 0.945 |
| Melt Index, g/10 min. | 0.5 | 1.2 | 1.0 | 1.3 | 1.8 | 2.9 |
| Flow Index, g/10 min. | 38 | 74 | 60 | 77 | 94 | 133 |
| Melt Flow Ratio | 75 | 62 | 60 | 59 | 52 | 46 |
| Activity | | | | | | |
| g polymer/mmol V-Hr-100 psi $C_2H_4$ | 3543 | 1678 | 3158 | 2305 | 2907 | 2532 |
| Activity Increase vs. Control, % | 25 | — | 88 | 37 | 73 | 51 |

| EXAMPLE | Comp. Exp. D | 14 | Comp. Exp. E | 15 | Comp. Exp. F | 16 |
|---|---|---|---|---|---|---|
| Catalyst | | | | | | |
| Carrier | $SiO_2$ | $SiO_2$ | $SiO_2$ | $SiO_2$ | $SiO_2$ | $SiO_2$ |
| Precursor | $VCl_3$/THF | $VCl_3$/THF | $VCl_3$/THF | $VCl_3$/THF | $VCl_3$/THF | $VCl_3$/THF |
| Modifier | DEAC | DEAC | DEAC | DEAC | DEAC | DEAC |
| Modifier/V Ratio | 1.5 | 1.5 | 1.5 | 1.5 | 4.5 | 4.5 |
| Activity Regulator | — | PMHS (1) | — | PMHS (1) | — | PMHS (1) |
| Activity Regulator/V Ratio | — | 5.5 | — | 5.5 | — | 7.0 |
| Cocatalyst | TEAL | TEAL | TNHAL | TNHAL | TIBA | TIBA |
| Al/V Ratio | 40 | 40 | 40 | 40 | 40 | 40 |
| Promoter | $CH_3CCl_3$ | $CH_3CCl_3$ | $CH_3CCl_3$ | $CH_3CCl_3$ | $CFCl_3$ | $CFCl_3$ |
| Promoter/Al Ratio | 1.0 | 1.0 | 1.0 | 1.0 | 1.0 | 1.0 |
| Reactions Conditions | | | | | | |
| Temperature, °C. | 85 | 85 | 85 | 85 | 85 | 85 |
| Pressure, kPa | 1050 | 1050 | 1050 | 1050 | 1050 | 1050 |
| Reaction time, minutes | 30 | 30 | 30 | 30 | 30 | 30 |
| Polymer Properties | | | | | | |
| Density, g/cm³ | — | 0.945 | 0.945 | 0.942 | 0.946 | 0.949 |
| Melt Index, g/10 min. | 14 | 0.5 | 3.0 | 0.4 | 8.0 | 1.5 |
| Flow Index, g/10 min. | 672 | 31 | 219 | 36 | 536 | 101 |
| Melt Flow Ratio | 48 | 61 | 73 | 91 | 67 | 67 |
| Activity | | | | | | |
| g polymer/mmol V-Hr-100 psi $C_2H_4$ | 2352 | 4223 | 2924 | 5559 | 4441 | 5969 |
| Activity Increase vs. Control, % | — | 80 | — | 90 | — | 34 |

EXAMPLES 17-27

Homopolymerization of Ethylene

The solid catalyst components prepared as described in Examples 3(b), 3(c), 3(e), 3(g), 3(h) and 3(i) were employed together with an alkylaluminum compound, as cocatalyst, and a halohydrocarbon compound, as polymerization promoter, to homopolymerize ethylene in a one-liter autoclave reactor.

The procedure employed was identical to that of Examples 4-16 except that hexene-1 was not employed.

Table IV below sets forth the details involving the composition of the catalysts employed in these polymerizations, as well as the reaction conditions employed during polymerization, the properties of the polymers produced, and the productivity of each catalyst system.

Shorthand designations employed in Table IV are the same as those employed in Table III.

COMPARATIVE EXAMPLES G-J

For comparative purposes, ethylene was homopolymerized as in Examples 17-27 employing the solid catalyst components prepared in accordance with Example 2, i.e., the catalyst components employed had not been treated with the polysiloxane oil activity regulator as in Example 3. The details of these polymerizations are set forth in Table IV below along with the details of Examples 17-27.

TABLE IV

| EXAMPLE | Comp. Exp. G | 17 | 18 | 19 | 20 |
|---|---|---|---|---|---|
| Catalyst | | | | | |
| Carrier | $SiO_2$ | $SiO_2$ | $SiO_2$ | $SiO_2$ | $SiO_2$ |
| Precursor | $VCl_3$/THF | $VCl_3$/THF | $VCl_3$/THF | $VCl_3$/THF | $VCl_3$/THF |
| Modifier | DEAC | DEAC | DEAC | DEAC | DEAC |
| Modifier/V Ratio | 1.5 | 1.5 | 1.5 | 1.5 | 1.5 |
| Activity Regulator | — | PMHS (1) | PMHS (2) | PDMS | TMCTS |
| Activity Regulator/V Ratio | — | 5.5 | 0.7 | 5.0 | 5.0 |
| Cocatalyst | TEAL | TEAL | TEAL | TEAL | TEAL |
| Al/V Ratio | 40 | 40 | 40 | 40 | 40 |
| Promoter | $CHCl_3$ | $CHCl_3$ | $CHCl_3$ | $CHCl_3$ | $CHCl_3$ |
| Promoter/Al Ratio | 1.0 | 1.0 | 1.0 | 1.0 | 1.0 |
| Reactions Conditions | | | | | |
| Temperature, °C. | 85 | 85 | 85 | 85 | 85 |
| Pressure, kPa | 1050 | 1050 | 1050 | 1050 | 1050 |
| Reaction time, minutes | 30 | 30 | 30 | 30 | 30 |
| Polymer Properties | | | | | |
| Density, g/cm$^3$ | 0.961 | 0.959 | — | 0.961 | — |
| Melt Index, g/10 min. | 1.6 | 2.0 | 1.2 | 0.5 | 0.3 |
| Flow Index, g/10 min. | 101 | 98 | 70 | 27 | 24 |
| Melt Flow Ratio | 63 | 49 | 58 | 54 | 81 |
| Activity | | | | | |
| g polymer/mmol V-Hr-100 psi $C_2H_4$ | 873 | 2093 | 1720 | 2043 | 1612 |
| Activity Increase vs. Control, % | — | 133 | 97 | 134 | 85 |

| EXAMPLE | Comp. Exp. H | 21 | 22 | Comp. Exp. I | 23 |
|---|---|---|---|---|---|
| Catalyst | | | | | |
| Carrier | $SiO_2$ | $SiO_2$ | $SiO_2$ | $SiO_2$ | $SiO_2$ |
| Precursor | $VCl_3$/THF | $VCl_3$/THF | $VCl_3$/THF | $VCl_3$/THF | $VCl_3$/THF |
| Modifier | DEAC | DEAC | DEAC | DEAC | DEAC |
| Modifier/V Ratio | 1.5 | 1.5 | 1.5 | 4.5 | 4.5 |
| Activity Regulator | — | PMHS (1) | PMHS (1) | — | PMHS (1) |
| Activity Regulator/V Ratio | — | 4.5 | 5.5 | — | 4.5 |
| Cocatalyst | TEAL | TEAL | TEAL | TEAL | TEAL |
| Al/V Ratio | 40 | 40 | 40 | 40 | 40 |
| Promoter | $CFCl_3$ | $CFCl_3$ | $CFCl_3$ | $CFCl_3$ | $CFCl_3$ |
| Promoter/Al Ratio | 1.0 | 1.0 | 1.0 | 1.0 | 1.0 |
| Reactions Conditions | | | | | |
| Temperature, °C. | 85 | 85 | 85 | 85 | 85 |
| Pressure, kPa | 1050 | 1050 | 1050 | 1050 | 1050 |
| Reaction time, minutes | 30 | 30 | 30 | 30 | 30 |
| Polymer Properties | | | | | |
| Density, g/cm$^3$ | 0.959 | 0.962 | 0.960 | 0.961 | 0.961 |
| Melt Index, g/10 min. | 1.4 | 0.8 | 1.1 | 0.5 | 0.3 |
| Flow Index, g/10 min. | 90 | 50 | 65 | 29 | 19 |
| Melt Flow Ratio | 64 | 62 | 59 | 57 | 63 |
| Activity | | | | | |
| g polymer/mmol V-Hr-100 psi $C_2H_4$ | 709 | 1444 | 1706 | 1640 | 2525 |
| Activity Increase vs. Control, % | — | 104 | 141 | — | 54 |

| EXAMPLE | 24 | 25 | Comp. Exp. J | 26 | 27 |
|---|---|---|---|---|---|
| Catalyst | | | | | |
| Carrier | $SiO_2$ | $SiO_2$ | $SiO_2$ | $SiO_2$ | $SiO_2$ |
| Precursor | $VCl_3$/THF | $VCl_3$/THF | $VCl_3$/THF | $VCl_3$/THF | $VCl_3$/THF |
| Modifier | DEAC | DEAC | DEAC | DEAC | DEAC |
| Modifier/V Ratio | 4.5 | 4.5 | 1.5 | 1.5 | 1.5 |
| Activity Regulator | PMHS (1) | PDMS | — | PMHS (1) | PMHS (1) |
| Activity Regulator/V Ratio | 7.0 | 5.0 | — | 4.5 | 5.5 |
| Cocatalyst | TEAL | TEAL | TEAL | TEAL | TEAL |

TABLE IV-continued

| | | | | | |
|---|---|---|---|---|---|
| Al/V Ratio | 40 | 40 | 40 | 40 | 40 |
| Promoter | CFCl$_3$ | CFCl$_3$ | CFCl$_3$ | CFCl$_3$ | CFCl$_3$ |
| Promoter/Al Ratio | 1.0 | 1.0 | 1.0 | 1.0 | 1.0 |
| Reactions Conditions | | | | | |
| Temperature, °C. | 85 | 85 | 125 | 125 | 125 |
| Pressure, kPa | 1050 | 1050 | 1050 | 1050 | 1050 |
| Reaction time, minutes | 30 | 30 | 30 | 30 | 30 |
| Polymer Properties | | | | | |
| Density, g/cm$^3$ | 0.959 | 0.959 | — | — | — |
| Melt Index, g/10 min. | 3.1 | 0.9 | — | — | — |
| Flow Index, g/10 min. | 174 | 48 | — | — | — |
| Melt Flow Ratio | 56 | 53 | — | — | — |
| Activity | | | | | |
| g polymer/mmol V-Hr-100 psi C$_2$H$_4$ | 3070 | 2125 | 1450 | 1103 | 1060 |
| Activity Increase vs. Control, % | 87 | 30 | — | −24 | −27 |

EXAMPLES 28–29

Gas Phase Polymerization

Solid catalyst components prepared in a manner similar to that described in Example 3 were employed together with an alkylaluminum compound (triethylaluminum), as cocatalyst, and a halohydrocarbon compound (CHCl$_3$), as polymerization promoter, to copolymerize ethylene and hexene-1 in a fluid bed reactor system similar to that described and illustrated in U.S. Pat. Nos. 4,302,565, 4,302,566 and 4,303,771.

In each polymerization, the solid catalyst component was continually fed to the polymerization reactor along with the triethylaluminum cocatalyst, as a 5 percent solution in isopentane, and the CHCl$_3$ polymerization promoter, also as a 5 percent solution in isopentane.

Hydrogen was added to the reactor as a chain transfer agent to regulate the molecular weight of the polymer produced. A small amount of nitrogen was also present.

Table V below sets forth the details involving the composition of the catalysts employed in these polymerizations, as well as the reaction conditions employed during polymerization, the properties of the polymers produced, and the productivity of each catalyst system.

Shorthand designations employed in Table V are the same as those employed in Table III.

Comparative Examples K–L

For comparative purposes, ethylene was copolymerized with hexene-1 as in Examples 28–29 employing solid catalyst components prepared in a manner similar to that described in Example 2, i.e., the catalyst components employed had not been treated with the polysiloxane oil activity regulator as in Example 3. The details of this polymerization are set forth in Table V below along with the details of Examples 28–29.

We claim:

TABLE V

| EXAMPLE | Comp. Exp. K | 28 | Comp. Exp. L | 29 |
|---|---|---|---|---|
| Catalyst | | | | |
| Carrier | SiO$_2$ | SiO$_2$ | SiO$_2$ | SiO$_2$ |
| Precursor | VCl$_3$/THF | VCl$_3$/THF | VCl$_3$/THF | VCl$_3$/THF |
| Modifier | DEAC | DEAC | DEAC | DEAC |
| Modifier/V Ratio | 1.3 | 1.3 | 2.6 | 2.6 |
| Activity Regulator | — | PMHS* | — | PMHS* |
| Activity Regulator/V Ratio | — | 4.2 | — | 3.8 |
| Cocatalyst | TEAL | TEAL | TEAL | TEAL |
| Al/V Ratio | 25 | 25 | 25 | 25 |
| Promoter | CHCl$_3$ | CHCl$_3$ | CHCl$_3$ | CHCl$_3$ |
| Promoter/Al Ratio | 1.5 | 1.5 | 1.5 | 1.5 |
| Reactions Conditions | | | | |
| Temperature, °C. | 85 | 85 | 85 | 85 |
| Total Pressure, kPa | 2315 | 2315 | 2315 | 2315 |
| Ethylene Partial Pressure, kPa | 1639 | 1639 | 1286 | 1286 |
| Nitrogen Partial Pressure, kPa | 642 | 642 | 1006 | 1008 |
| Hydrogen Partial Pressure, kPa | 34 | 34 | 23 | 21 |
| Comonomer | Hexene-1 | Hexene-1 | Hexene-1 | Hexene-1 |
| Comonomer/Ethylene Mol Ratio | 0.009 | 0.009 | 0.061 | 0.063 |
| Hydrogen/Ethylene Mol Ratio | 0.021 | 0.021 | 0.018 | 0.016 |
| Residence Time, hours | 4.4 | 4.2 | 4.2 | 3.9 |
| Polymer Properties | | | | |
| Density, g/cm$^3$ | 0.946 | 0.946 | 0.921 | 0.923 |
| Melt Index, g/10 min. | 0.05 | 0.08 | 0.61 | 0.56 |
| Flow Index, g/10 min. | 5.4 | 7.1 | 48 | 45 |
| Melt Flow Ratio | 108 | 89 | 79 | 80 |
| n-Hexane Extractables, wt. % | 0.72 | 0.32 | 3.5 | 2.5 |
| Productivity | | | | |
| V, ppm | 6.6 | 4.8 | 6.0 | 5.6 |

*The Activity Regulator employed was polymethylhydrosiloxane, methyl terminated, molecular weight = 360–420.

1. A solid catalyst component consisting essentially of:

(1) a solid, particulate, porous inorganic carrier, as support for (2) the reaction product of (a) a vanadium trihalide and (b) an electron donor,
(3) a boron halide or alkylaluminum modifier, and
(4) a polysiloxane oil activity regulator having the formula

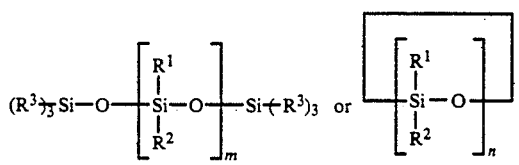

wherein:
m is a number having a value of from 0 to 100,
n is a number having a value of from 2 to 100,
$R^1$ is hydrogen or a monovalent hydrocarbon radical free of aliphatic unsaturation containing from 1 to 20 carbon atoms,
$R^2$ is a monovalent hydrocarbon radical free of aliphatic unsaturation containing from 1 to 20 carbon atoms, and
$R^3$ is selected from the group consisting of: —X, —$R^1$, —$OR^1$, —$COOR^1$, and —$NR^1R^2$
wherein:
X is halogen and $R^1$ and $R^2$ are as defined above.

2. A solid catalyst component as in claim 1 wherein the polysiloxane oil activity regulator is present in an amount sufficient to provide a molar ratio of such polysiloxane oil to the vanadium trihalide/electron donor reaction product of from 0.1:1 to 10:1.

3. A solid catalyst component as in claim 2 wherein $R^1$ is hydrogen, an alkyl radical containing from 1 to 6 carbon atoms, or an aryl radical containing from 6 to 20 carbon atoms; $R^2$ is an alkyl radical containing from 1 to 6 carbon atoms or an aryl radical containing from 6 to 20 carbon atoms; $R^3$ is halogen, an alkyl radical containing from 1 to 6 carbon atoms, or an aryl radical containing from 6 to 20 carbon atoms; m is a number having a value of from 2 to 50; and n is a number having a value of from 3 to 10.

4. A solid catalyst component as in claim 3 wherein the polysiloxane oil activity regulator is a methyl terminated polymethylhydrosiloxane.

5. A solid catalyst component as in claim 3 wherein the polysiloxane oil activity regulator is a chlorine terminated polydimethylsiloxane.

6. A solid catalyst component as in claim 3 wherein the polysiloxane oil activity regulator is 1,3,5,7-tetramethylcyclotetrasiloxane.

7. A solid catalyst component as in claim 1 wherein the polysiloxane oil activity regulator is present in an amount sufficient to provide a molar ratio of the polysiloxane oil to vanadium trihalide/electron donor reaction product of from 0.2:1 to 6:1.

8. A solid catalyst component as in claim 7 wherein $R^1$ is hydrogen, an alkyl radical containing from 1 to 6 carbon atoms, or an aryl radical containing from 6 to 20 carbon atoms; $R^2$ is an alkyl radical containing from 1 to 6 carbon atoms or an aryl radical containing from 6 to 20 carbon atoms; $R^3$ is halogen, an alkyl radical containing from 1 to 6 carbon atoms, or an aryl radical containing from 6 to 20 carbon atoms; m is a number having a value of from 2 to 50; and n is a number having a value of from 3 to 10.

9. A solid catalyst component as in claim 8 wherein the polysiloxane oil activity regulator is a methyl terminated polymethylhydrosiloxane.

10. A solid catalyst component as in claim 8 wherein the polysiloxane oil activity regulator is a chlorine terminated polydimethylsiloxane.

11. A solid catalyst component as in claim 8 wherein the polysiloxane oil activity regulator is 1,3,5,7-tetramethylcyclotetrasiloxane.

12. A catalyst system comprising:
(A) the solid catalyst component of claim 1,
(B) an alkylaluminum cocatalyst having the formula $$Al(R^5)_3$$

wherein:
$R^5$ is a saturated hydrocarbon radical containing from 1 to 14 carbon atoms, and
(C) a halohydrocarbon polymerization promoter having the formula $$(R^6)_b CX'_{(4-b)}$$

wherein:
$R^6$ is hydrogen or an unsubstituted or halosubstituted alkyl radical containing from 1 to 6 carbon atoms,
$X'$ is halogen, and
b is 0, 1 or 2.

13. A catalyst system as in claim 12 wherein the polysiloxane oil activity regulator is present in an amount sufficient to provide a molar ratio of such polysiloxane oil to the vanadium trihalide/electron donor reaction product of from 0.1:1 to 10:1.

14. A catalyst system as in claim 13 wherein $R^1$ is hydrogen, an alkyl radical containing from 1 to 6 carbon atoms, or an aryl radical containing from 6 to 20 carbon atoms; $R^2$ is an alkyl radical containing from 1 to 6 carbon atoms or an aryl radical containing from 6 to 20 carbon atoms; $R^3$ is halogen, an alkyl radical containing from 1 to 6 carbon atoms, or an aryl radical containing from 6 to 20 carbon atoms; m is a number having a value of from 2 to 50; and n is a number having a value of from 3 to 10.

15. A catalyst system as in claim 14 wherein the polysiloxane oil activity regulator is a methyl terminated polymethylhydrosiloxane.

16. A catalyst system as in claim 14 wherein the polysiloxane oil activity regulator is a chlorine terminated polydimethylsiloxane.

17. A catalyst system as in claim 14 wherein the polysiloxane oil activity regulator is 1,3,5,7-tetramethylcyclotetrasiloxane.

18. A catalyst system as in claim 12 wherein the polysiloxane oil activity regulator is present in an amount sufficient to provide a molar ratio of the polysiloxane oil to vanadium trihalide/electron donor reaction product of from 0.2:1 to 6:1.

19. A catalyst system as in claim 18 wherein $R^1$ is hydrogen, an alkyl radical containing from 1 to 6 carbon atoms, or an aryl radical containing from 6 to 20 carbon atoms; $R^2$ is an alkyl radical containing from 1 to 6 carbon atoms or an aryl radical containing from 6 to 20 carbon atoms; $R^3$ is halogen, an alkyl radical containing from 1 to 6 carbon atoms, or an aryl radical containing from 6 to 20 carbon atoms; m is a number having a value of from 2 to 50; and n is a number having a value of from 3 to 10.

20. A catalyst system as in claim 19 wherein the polysiloxane oil activity regulator is a methyl terminated polymethylhydrosiloxane.

21. A catalyst system as in claim 19 wherein the polysiloxane oil activity regulator is a chlorine terminated polydimethylsiloxane.

22. A catalyst system as in claim 19 wherein the polysiloxane oil activity regulator is 1,3,5,7-tetramethylcyclotetrasiloxane.

23. In a catalyst system comprising:
(A) a solid catalyst component consisting essentially of
 (1) a solid, particulate, porous inorganic carrier, as support for
 (2) the reaction product of (a) a vanadium trihalide and (b) an electron donor, and
 (3) a boron halide or alkylaluminum modifier,
(B) an alkylaluminum cocatalyst, and
(C) a halohydrocarbon polymerization promoter,
the improvement wherein the solid catalyst component (A) is treated with a polysiloxane oil activity regulator having the formula

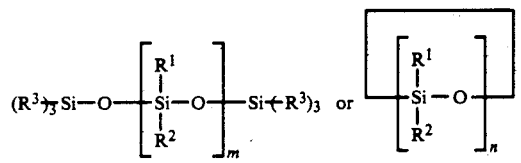

wherein:
m is a number having a value of from 0 to 100,
n is a number having a value of from 2 to 100,
$R^1$ is hydrogen or a monovalent hydrocarbon radical free of aliphatic unsaturation containing from 1 to 20 carbon atoms,
$R^2$ is a monovalent hydrocarbon radical free of aliphatic unsaturation containing from 1 to 20 carbon atoms, and
$R^3$ is selected from the group consisting of: —X, —R, —$OR^1$, —COOR, and —$NR^1R^2$
wherein:
X is halogen and $R^1$ and $R^2$ are as defined above.

24. A catalyst system as in claim 23 wherein the polysiloxane oil activity regulator is present in an amount sufficient to provide a molar ratio of such polysiloxane oil to the vanadium trihalide/electron donor reaction product of from 0.1:1 to 10:1.

25. A catalyst system as in claim 24 wherein $R^1$ is hydrogen, an alkyl radical containing from 1 to 6 carbon atoms, or an aryl radical containing from 6 to 20 carbon atoms; $R^2$ is an alkyl radical containing from 1 to 6 carbon atoms or an aryl radical containing from 6 to 20 carbon atoms; $R^3$ is halogen, an alkyl radical containing from 1 to 6 carbon atoms, or an aryl radical containing from 6 to 20 carbon atoms; m is a number having a value of from 2 to 50; and n is a number having a value of from 3 to 10.

26. A catalyst system as in claim 25 wherein the polysiloxane oil activity regulator is a methyl terminated polymethylhydrosiloxane.

27. A catalyst system as in claim 25 wherein the polysiloxane oil activity regulator is a chlorine terminated polydimethylsiloxane.

28. A catalyst system as in claim 25 wherein the polysiloxane oil activity regulator is 1,3,5,7-tetramethylcyclotetrasiloxane.

29. A catalyst system as in claim 23 wherein the polysiloxane oil activity regulator is present in an amount sufficient to provide a molar ratio of the polysiloxane oil to vanadium trihalide/electron donor reaction product of from 0.2:1 to 6:1.

30. A catalyst system as in claim 29 wherein $R^1$ is hydrogen, an alkyl radical containing from 1 to 6 carbon atoms, or an aryl radical containing from 6 to 20 carbon atoms; $R^2$ is an alkyl radical containing from 1 to 6 carbon atoms or an aryl radical containing from 6 to 20 carbon atoms; $R^3$ is halogen, an alkyl radical containing from 1 to 6 carbon atoms, or an aryl radical containing from 6 to 20 carbon atoms; m is a number having a value of from 2 to 50; and n is a number having a value of from 3 to 10.

31. A catalyst system as in claim 30 wherein the polysiloxane oil activity regulator is a methyl terminated polymethylhydrosiloxane.

32. A catalyst system as in claim 30 wherein the polysiloxane oil activity regulator is a chlorine terminated polydimethylsiloxane.

33. A catalyst system as in claim 30 wherein the polysiloxane oil activity regulator is 1,3,5,7-tetramethylcyclotetrasiloxane.

* * * * *